(12) United States Patent
Wheeler

(10) Patent No.: US 9,097,380 B2
(45) Date of Patent: Aug. 4, 2015

(54) ADJUSTABLE SECURITY BRACKET

(75) Inventor: Wade Wheeler, Hillsboro, OR (US)

(73) Assignee: Mobile Tech, Inc., Lake Oswego, OR (US)

( * ) Notice: Subject to any disclaimer, the term of this patent is extended or adjusted under 35 U.S.C. 154(b) by 92 days.

(21) Appl. No.: 13/536,867

(22) Filed: Jun. 28, 2012

(65) Prior Publication Data

US 2013/0043369 A1     Feb. 21, 2013

Related U.S. Application Data

(63) Continuation-in-part of application No. 12/854,816, filed on Aug. 11, 2010, now abandoned.

(51) Int. Cl.
| | |
|---|---|
| *G08B 13/12* | (2006.01) |
| *F16M 13/00* | (2006.01) |
| *A47F 7/024* | (2006.01) |
| *E05B 73/00* | (2006.01) |
| *F16M 11/04* | (2006.01) |
| *F16M 13/02* | (2006.01) |

(52) U.S. Cl.
CPC ............... *F16M 13/00* (2013.01); *A47F 7/024* (2013.01); *E05B 73/0017* (2013.01); *F16M 11/041* (2013.01); *F16M 13/022* (2013.01); *F16M 2200/066* (2013.01); *F16M 2200/08* (2013.01)

(58) Field of Classification Search
CPC .......... F16M 13/022; F16M 2200/066; F16M 2200/08
USPC ........................................ 248/551, 683, 205.3
See application file for complete search history.

(56) References Cited

U.S. PATENT DOCUMENTS

| | | | |
|---|---|---|---|
| 5,457,745 A * | 10/1995 | Wang ............................. | 379/454 |
| 5,903,645 A * | 5/1999 | Tsay .............................. | 379/455 |
| 7,710,266 B2 * | 5/2010 | Belden et al. .............. | 340/568.3 |
| 8,814,128 B2 * | 8/2014 | Trinh et al. ................... | 248/551 |

* cited by examiner

*Primary Examiner* — Amy Sterling
(74) *Attorney, Agent, or Firm* — Bruce A. Kaser

(57) ABSTRACT

The invention is a security bracket for a retail display. The security bracket has guide pins extending laterally outwardly from each side of a base member. Sliding blocks are mounted to each pair of guide pins. The sliding block also carries a vertical arm that may be adjusted upwardly or downwardly. Adjustment of the sliding blocks relative to a hand-held allows the security bracket to be used for mounting hand-helds with different footprints to a retail display.

1 Claim, 6 Drawing Sheets

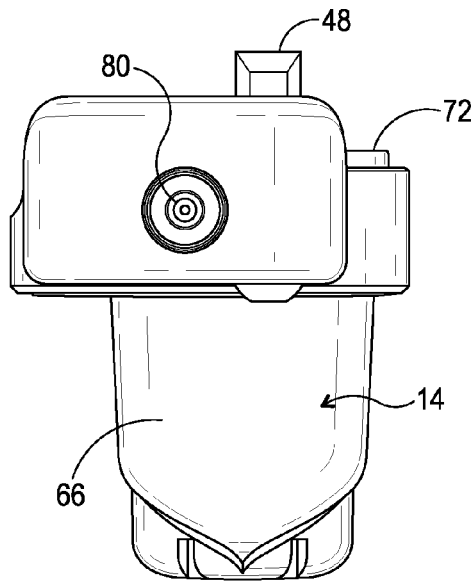
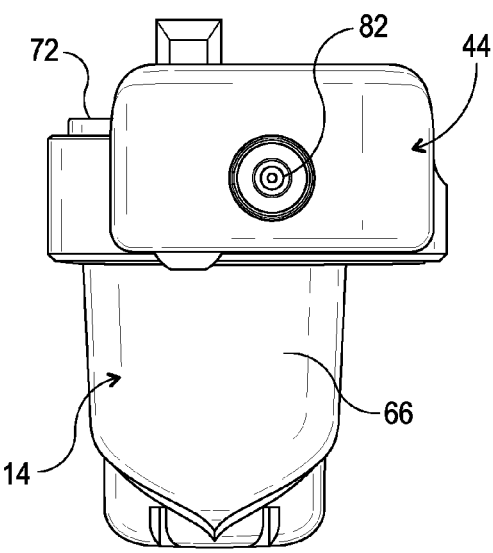
Fig. 13    Fig. 14
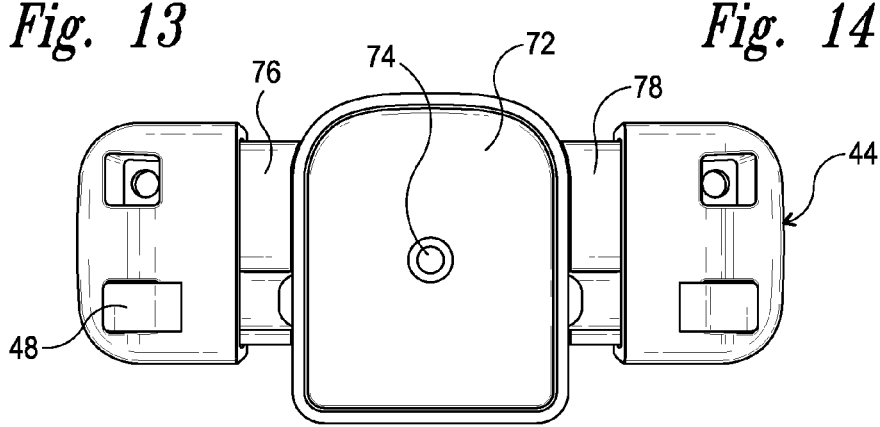
Fig. 15
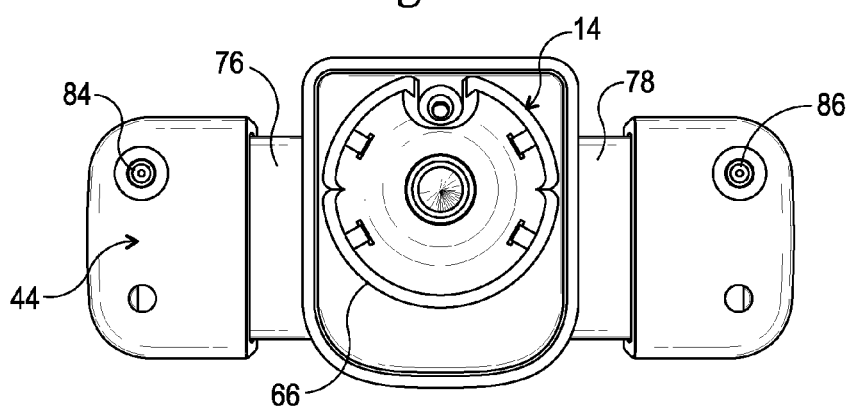
Fig. 16

ADJUSTABLE SECURITY BRACKET

TECHNICAL FIELD

The present invention relates to retail displays for hand-held electronic devices (cell phones, GPS devices, etc). More particularly, the invention relates to an adjustable bracket for adapting to the different sizes of hand-helds that are typically mounted on a retail display.

BACKGROUND OF THE INVENTION

The sizes, shapes, and thicknesses of today's hand-held devices (cell phones, etc.) evolve on a regular basis from one model to the next. In the security industry (i.e., companies that supply anti-theft products to retailers) it is desirable to have mechanical mounting means for physically securing hand-helds to displays that can adapt to different kinds of hand-helds. The design disclosed here provides one type of mechanical bracket that is well-suited for the different footprints of modern cell phones, PDAs and GPS devices.

SUMMARY OF THE INVENTION

The invention is an adjustable security bracket that comprises a base member that carries the hand-held. At least two guide pins extend from opposite sides of the base member.

The invention includes a sliding base block that is mounted on the guide pins. This arrangement puts one base block on at least opposite lateral sides of the base member (and the hand-held).

Each base block is slidable inwardly or outwardly to a fixed or desired position relative to the lateral side of the base member. This allows positioning of a vertical security arm relative to each lateral side of the hand-held. The vertical security arm may slide upwardly or downwardly relative to the base block. The security arm has an inwardly directed lip that is configured to pull an edge of the hand-held downwardly against the top surface of the base member.

The foregoing summary will become better understood upon review of the attached drawings which are to be taken in conjunction with the detailed description of the invention.

BRIEF DESCRIPTION OF THE DRAWINGS

In the drawings, like reference numerals and letters refer to like parts throughout the various views, and wherein:

FIG. 13 is a side view of the alternative embodiment, looking at the right-hand side;

FIG. 14 is a side view of the alternative embodiment, looking at the left-hand side;

FIG. 15 is a top view of the alternative embodiment; and

FIG. 16 is a bottom view of the alternative embodiment.

BEST MODE OF THE INVENTION

Figure 1:
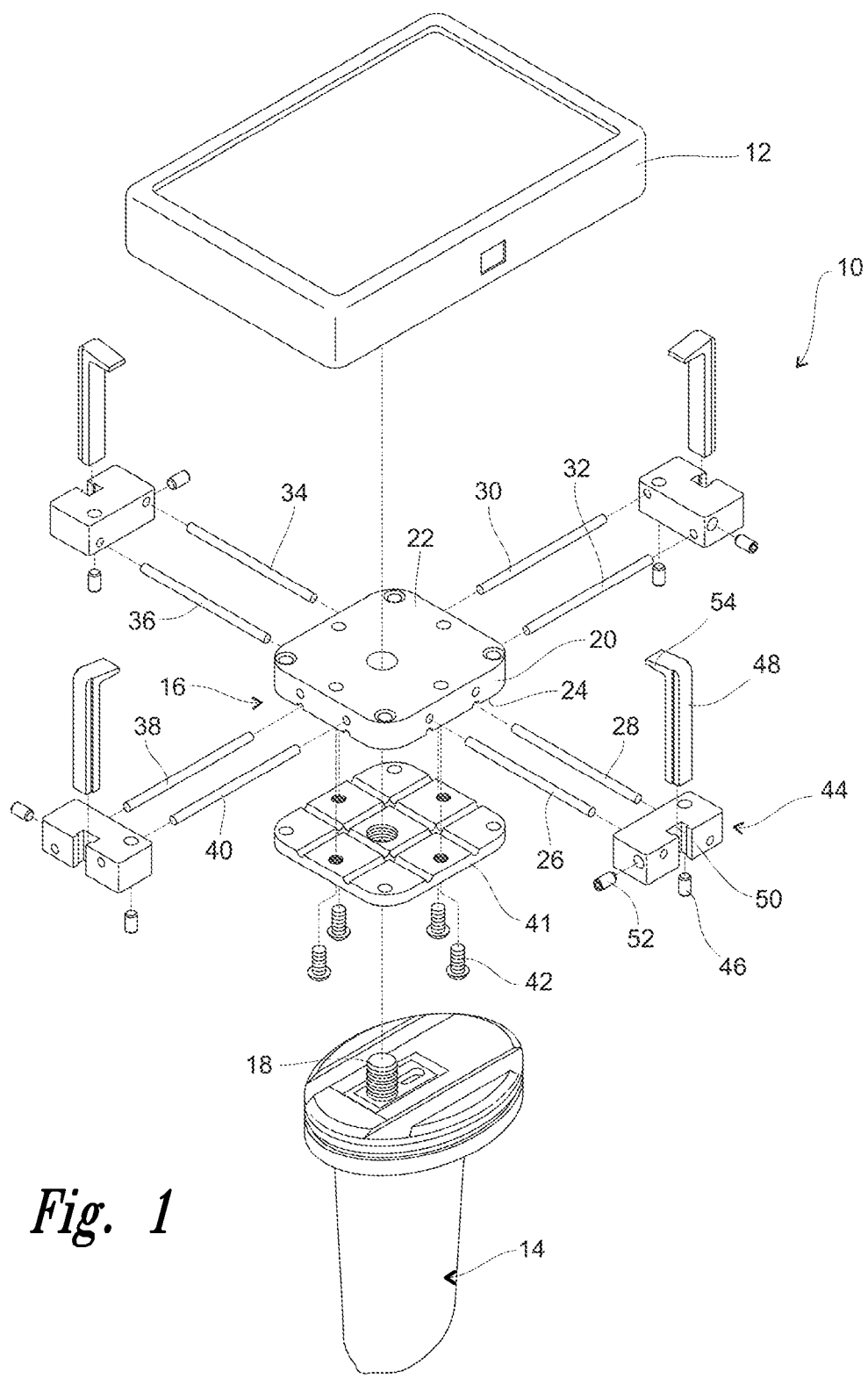
FIG. 1 is an exploded view of an adjustable security bracket designed in accordance with the invention.

Referring now to the drawings, and first to FIG. 1, shown generally at 10 is an adjustable security bracket constructed in accordance with the invention. The bracket is designed to mount an electronic hand-held device 12 to a "puck" 14 that is lifted to and from a retail display. "Pucks" are sometimes referred to as "mounting members" in the patent literature. However, as a person skilled in the art would know, these members provide the mounts for lifting and replacing displayed hand-helds to and from a display counter surface.

In accordance with the invention, part of bracket 10 includes a base member, indicated generally at 16. The base member 16 is connected to the puck 14 by a screw 18 threaded into the base member 16 (the threads are not shown), which is typical of these kinds of displays.

The base member 16 consists of a body or block 20 having a top surface 22 and a lower surface 24. Extending laterally outwardly from all four sides of base member 16 are guide pins 26, 28, 30, 32, 34, 36, 38, 40. In the embodiment shown in FIG. 1, there are two pairs of pins (e.g., 26, 28 and 34, 36) that extend laterally outwardly from opposite sides of base member 16.

The embodiment illustrated in FIG. 1 shows four pairs of guide pins 26, 28, 30, 32, 34, 36, 38, 40 for capturing four sides of the hand-held 12. In the alternative embodiment illustrated in FIGS. 5-9 (which will be described later), the hand-held 12 is captured only on the lateral sides.

The guide pins 26, 28, 30, 32, 34, 36, 38, 40 are captured in the base member 16 by a plate 41 that presses the inner ends of the pins against the base member's body 20. The plate 41 sandwiches the pin ends via screws 42. Each pair of guide pins carries a base or junction block, indicated generally at 44. The base block 44 is slidable laterally inwardly or outwardly on its respective guide pins. The base block 44 is held in fixed position by a set screw 46 that may be tightened or untightened, as needed, in order to move the position of base block 44.

A vertical security arm 48 is mounted in a slot 50 in each base block 44. The vertical security arm 48 may likewise be slidably moved upwardly or downwardly to a desired position and held in a fixed spot by another set screw 52 in the base block 44.

Figure 2:
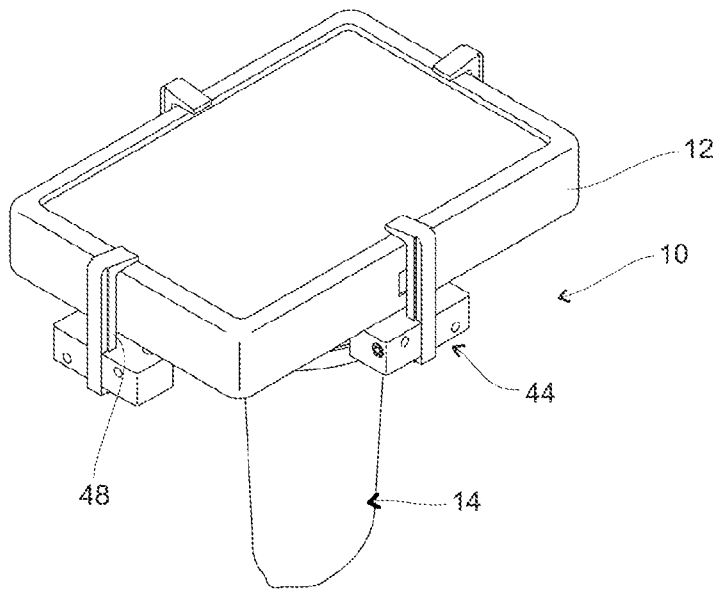
FIG. 2 is a pictorial view of the bracket shown in FIG. 1.
Figure 3:
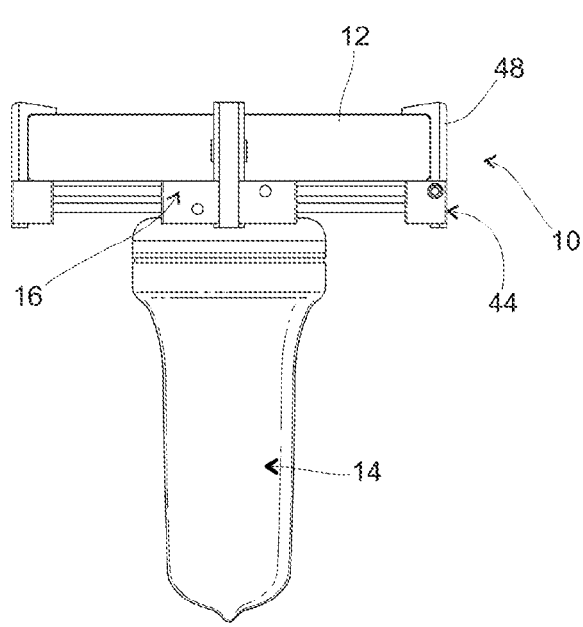
FIG. 3 is a frontal view of the security bracket shown in FIGS. 1 and 2.
Figure 4:
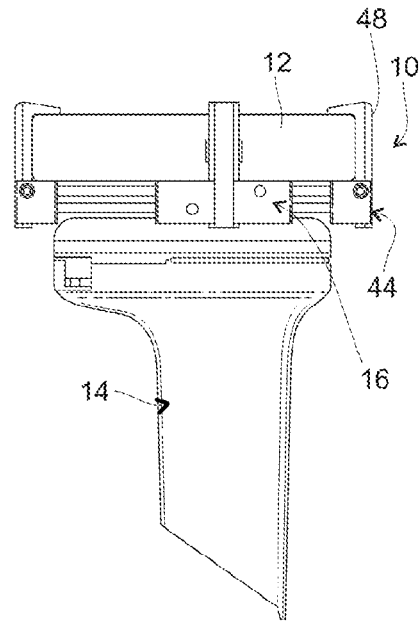
FIG. 4 is a side view of the security bracket shown in FIGS. 1-3.

The arrangement described above enables hand-helds having different sizes to be mounted to the base member 16 (and, therefore, to the "puck" 14). The set screws 46, 52 enable the base blocks 44 to be moved laterally inwardly or outwardly as needed to position the vertical security arm 48 next to the edge of the hand-held 12. Similarly, the vertical security arm 48 has an inwardly pointing lip 54 that captures the top edge of the hand-held, in the manner illustrated in FIG. 2.

Figure 5:
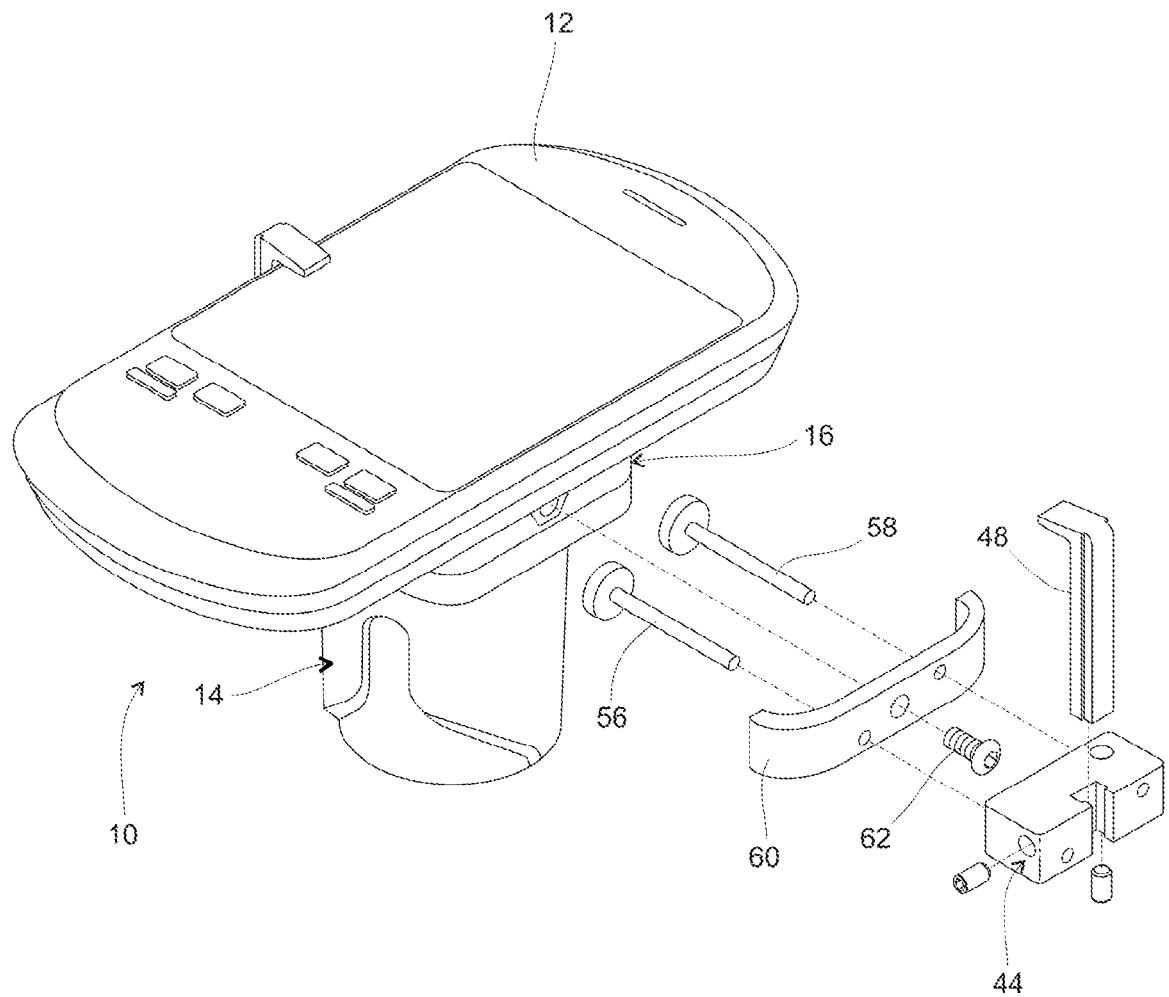
FIG. 5 is an exploded view of an alternative embodiment of the adjustable security bracket.
Figure 6:
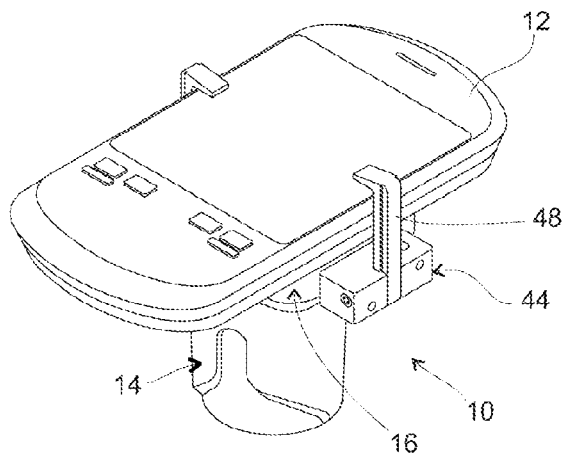
FIG. 6 is a pictorial view of the security bracket shown in FIG. 5.
Figure 7:
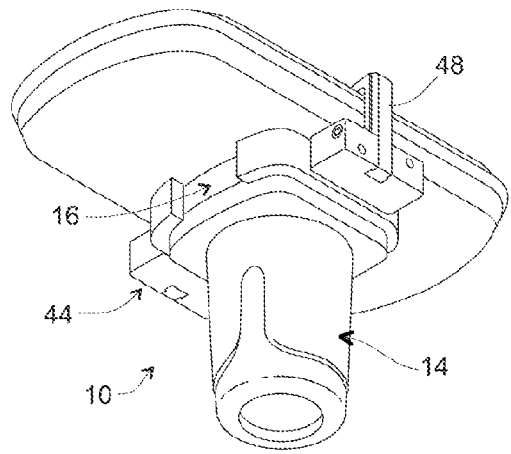
FIG. 7 is another perspective view of the security bracket shown in FIGS. 5-6, but looking from underneath the bracket.
Figure 8:
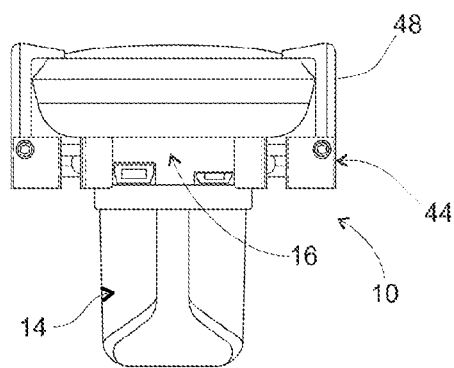
FIG. 8 is a frontal view of the security bracket shown in FIGS. 5-7.
Figure 9:
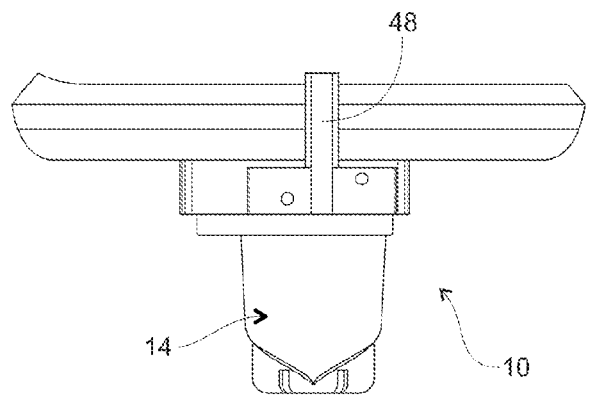
FIG. 9 is a side view of the security bracket shown in FIGS. 5-8.
Figure 10:
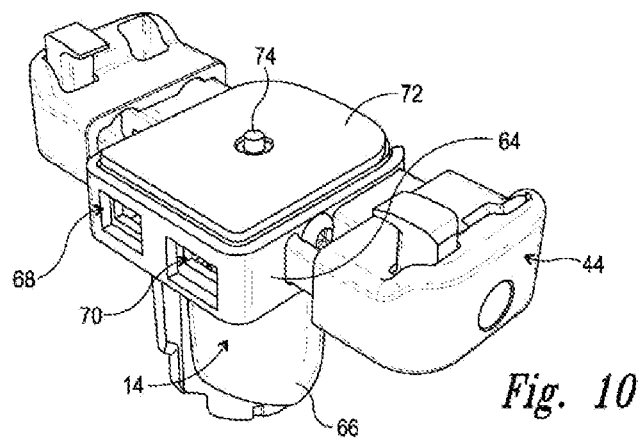
FIG. 10 is a perspective view of an alternative embodiment.

Directing attention now to FIG. 5, as indicated above, an alternative version of the invention involves a security bracket designed to capture only opposite lateral sides of the hand-held. In this version of the design, two guide pins 56, 58 are captured against a base member 22 or puck 14, (as the case may be) by a bracket 60. The bracket 60 is held in position by a screw 62. The guide pins 56, 58 extend laterally outwardly.

The ends of the pins 56, 58 carry a similar type of base block 44 having the same set screw and vertically security arm described above.

FIGS. 10-16 illustrate another embodiment that integrates the foregoing security bracket structure as part of the "puck" 14. In this embodiment, the puck 14 includes an upper part (indicated generally by arrow 64) and a lower part (indicated generally by arrow 66). The upper part 64 houses an electronic control board ("ECB") that is shown at 65 in FIG. 12. The lower part arrow 66 is shaped to rest on a retail display, mostly likely nested in a socket opening (not shown) in a base that is fixed to the display, or the like. Arrows 68, 70 generally indicate port connections to the ECB. These port connections 68, 70 enable cabling to be connected to the upper part 64 of the puck 14. Arrow 72 indicates an adhesive material that is conventionally used to mount the hand-held device 12 to the puck 14. A security sensor switch is indicated at 74.

Figure 11:
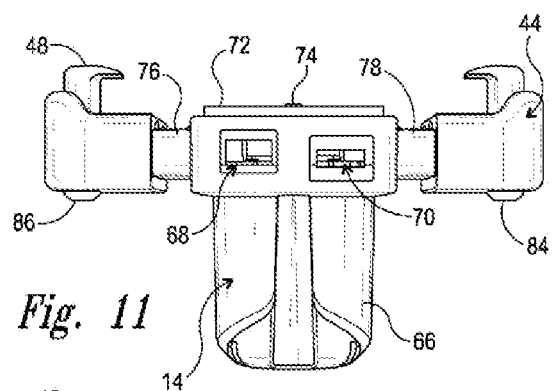
FIG. 11 is a front view of the alternative embodiment.
Figure 12:
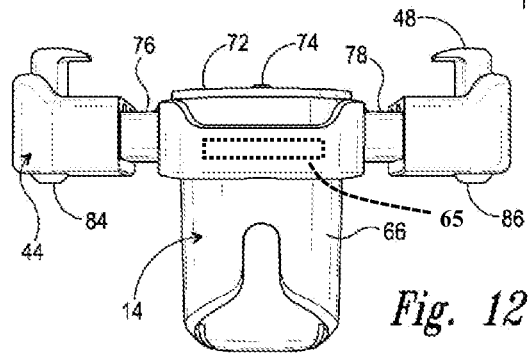
FIG. 12 is a back view of the alternative embodiment.

Rather than use the guide pins 26, 28, 30, 32, 34, 36, 38, 40 in the manner previously described (the embodiment illustrated in FIGS. 1-9), the second embodiment has guide beams 76, 78 that are fixed to the upper part 64 of the puck and extend laterally outwardly from opposite sides (see, e.g., FIG. 11). Preferably, guide beams 76, 78 are integrated or molded as part of the same structure as the upper part 64. The "base block 44" previously described is represented by the same reference numeral in FIGS. 10-16. However, in this last embodiment, the base block 44 slides over the beams 76, 78. Referring to FIGS. 13 and 14, the lateral position of block 44 is adjusted by screws 80, 82, which drive the blocks 44 inwardly or outwardly depending on the direction of screw rotation. Similarly, the vertical height of the security arm 48 on each side is adjusted by rotating screws 84, 86.

The embodiment illustrated in FIGS. 10-16 provides a cleaner looking configuration for the retailer in that it combines security bracket functions with normal puck functions.

The foregoing description is not intended to limit the spirit and scope of the invention. Instead, the spirit and scope of the invention is to be limited only by the subjoined claims that follow, the interpretation of which is to be made in accordance with the standard doctrines of patent claim interpretation.

What is claimed is:

1. A mounting member for retail display of an electronic device, comprising:
    a mounting puck having an upper portion and a lower portion, said upper portion carrying an electronic control board and having at least one port for a cable connection, said upper portion further including a top surface defined by an adhesive material, and further including beam means integrated with said upper portion, said beam means extending laterally outwardly from opposite sides of said upper portion, said beam means slidingly carrying a base block member that is slidable inwardly and outwardly on said beam means to a fixed position on a lateral side of said upper portion, and a vertically slidable security arm mounted to said base block for pulling said hand-held against the top surface of said adhesive material, said lower portion of said puck being shaped to rest said puck on said display.

* * * * *